(12) United States Patent
Alexander

(10) Patent No.: US 7,120,595 B2
(45) Date of Patent: Oct. 10, 2006

(54) METHOD AND SYSTEM FOR PROVIDING ONLINE COMPARISON SHOPPING

(75) Inventor: Geoffrey D. Alexander, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 09/863,342

(22) Filed: May 23, 2001

(65) Prior Publication Data

US 2002/0178014 A1 Nov. 28, 2002

(51) Int. Cl.
*G06Q 30/00* (2006.01)
(52) U.S. Cl. ...................................................... 705/26
(58) Field of Classification Search ................ 705/26, 705/27
See application file for complete search history.

(56) References Cited

U.S. PATENT DOCUMENTS

| | | | | |
|---|---|---|---|---|
| 5,960,411 A | * | 9/1999 | Hartman et al. ............... | 705/26 |
| 5,966,697 A | | 10/1999 | Fergerson et al. ............. | 705/26 |
| 6,029,141 A | * | 2/2000 | Bezos et al. ................... | 705/27 |
| 6,123,259 A | | 9/2000 | Ogasawara .................. | 235/380 |
| 6,125,352 A | | 9/2000 | Franklin et al. ............... | 705/26 |
| 6,134,548 A | | 10/2000 | Gottsman et al. .............. | 707/5 |

FOREIGN PATENT DOCUMENTS

| | | |
|---|---|---|
| JP | 10143563 A | 5/1998 |
| JP | 2000113053 A | 4/2000 |
| WO | WO 00/43850 | 7/2000 |
| WO | WO 02/27621 A1 * | 4/2002 |

OTHER PUBLICATIONS

No Author, "Cellphone-centric devices to determine Bluetooth's future", Bluetooth World, n6, p. 32, Dec. 2001. Retrieved from Dialog File: 9, Acc#: 02813001.*
INSPEC Abstract No. 6608054; Soe Tsyr Yan, Liu A; Next-generation agent-enabled comparison shopping.
INSPEC Abstract No. 6560365; Oinas Kukkonen H.; Balancing the vendor and consumer requirements for electronic shopping systems.
INSPEC Abstract No. 5811622; Jarvenpaa SL, Todd PA; Consumer reactions to electronic shopping on the World Wide Web.
INSPEC Abstract No. 6512308; Benn W., Gorlitz O., Neubert R.; Enabling integrative negotiations by adaptive software agents.
INSPEC Abstract No. 6201356; Tilson R., Jianming Dong, Martin S., Kieke E.; A comparison of two current e-commerce sites.
INSPEC Abstract No. 6138614; Wilder C.; Call your agent for online shopping.
INSPEC Abstract No. 6094217; Cunningham M.; The perils of international E-commerce. A risk worth taking?.

* cited by examiner

*Primary Examiner*—Mark Fadok
*Assistant Examiner*—Naeem Haq
(74) *Attorney, Agent, or Firm*—Martin J. McKinley, Esq.; Synnestvedt & Lechner LLP

(57) ABSTRACT

A method and system for providing online comparison shopping are disclosed. The system provides online comparison shopping through a designated website accessible by a user via a communication network such as the Internet The method includes the steps of compiling a shopping list identifying specific items to be purchased, receiving optimization criteria specified by the user, optimizing, by the system, the shopping list based on the optimization criteria to produce an optimal shopping order, and displaying the optimal shopping order to the user if the optimal shopping order exists.

34 Claims, 2 Drawing Sheets

METHOD AND SYSTEM FOR PROVIDING ONLINE COMPARISON SHOPPING

BACKGROUND OF THE INVENTION

1. Field of the Invention

The present invention relates to online comparison shopping and, more particularly, to a method and system for providing improved online comparison shopping.

2. Discussion of the Related Art

There are a number of websites that offer online comparison shopping. These websites maintain searchable databases containing a variety of different vendor and product information supplied by online vendors. Conventionally, these websites are configured to search for the lowest prices on products requested by a user. Some websites such as http://www.pricegrabber.com provide more sophisticated online comparison shopping wherein the user can enter a shipping location so that shipping and tax costs are included in the compared prices. Other online comparison shopping websites such as http://www.travelocity.com allow the user to purchase the lowest cost flight from a range of different airlines.

PCT Patent Publication No. WO 00/43850 (PCT International Application No. PCT/US00/01401) discloses another online comparison shopping system. In this system, a user is able to purchase multiple items online from different online vendors using a single purchase order. For each item to be purchased, the system compares prices from different vendors and provides a comparison list of vendors that offer the requested item along with the price of the item offered by each vendor. The user views this list and selects one vendor from the list as well as the quantity of the item to be purchased. The user then adds the selected item to his "virtual shopping cart". This process is repeated for each item that the user wishes to purchase. Once all the items are placed in the virtual shopping cart, the user enters his or her shipping and payment information. This causes the system to generate a single purchase order identifying the user's selected items from multiple vendors. The system disaggregates this order by sending an appropriate portion of the order to each vendor.

Problems, however, exist in such conventional online comparison shopping systems. A price comparison between multiple vendors who offer a requested product is made only for one product at a time. This means that, for each item to be purchased, the user must individually request for a comparison list, view the comparison list and manually select an item/vendor from the list. This process can be time consuming and tedious to the user, especially when a large number of items are to be purchased. Furthermore, once the shopping order has been placed to different vendors, the user must track a plurality of different shipments of the purchased items by the different vendors. This process also takes a considerable amount of the user's time, and can often aggravate the user.

Accordingly, there is a need for an improved method and system for providing online comparison shopping which overcomes the above-described problems and other problems associated with conventional online comparison shopping methods and systems.

SUMMARY OF THE INVENTION

The present invention provides a method and system for providing improved online comparison shopping which overcomes the problems associated with conventional online comparison shopping methods and systems.

Particularly, the system of the present invention compiles a shopping list for the user which identifies specific items that the user wishes to purchase, such as the name of the product, manufacturer, model number, etc. Then the system allows the user to specify certain optimization criteria (shopping criteria) for obtaining an optimal shopping order based on the user's shopping list. Examples of the optimization criteria can include, but are not limited to, the lowest total cost including any tax and/or shipping charges, vendor preferences or dislikes, vendor shipment methods, delivery speed, etc.

Based on the user-specified optimization criteria and any optimization criteria pre-set by the system, the system optimizes the user's shopping list to produce an optimal shopping order using existing optimization techniques or programs. That is, the system is configured to generate automatically a single purchase order for purchasing all items on the shopping list, wherein the order satisfies the optimization criteria set by the user and the system. This optimization shopping order will identify a single vendor for each of the items on the shopping list. The user is able to modify the generated optimal shopping order to reflect any last minute changes by the user. In certain situations, the system may be unable to generate an optimal shopping order because, e.g., no online vendors offer certain items on the shopping list. In these cases, the user is notified of the optimization failure and the system can be configured to re-attempt the optimization process (e.g., after a certain time period) until an optimal shopping order is generated.

If the user approves the optimal shopping order, the shopping order is processed according to known techniques. For example, the shopping order is sent to specific vendors so that shipments of the items identified in the shopping order can be made. Each vendor system is configured to transmit their shipment tracking information to the present system. Then the user can view and monitor this shipment tracking information for all items in the shopping order from one website.

DETAILED DESCRIPTION OF THE PREFERRED EMBODIMENTS

Figure 1:
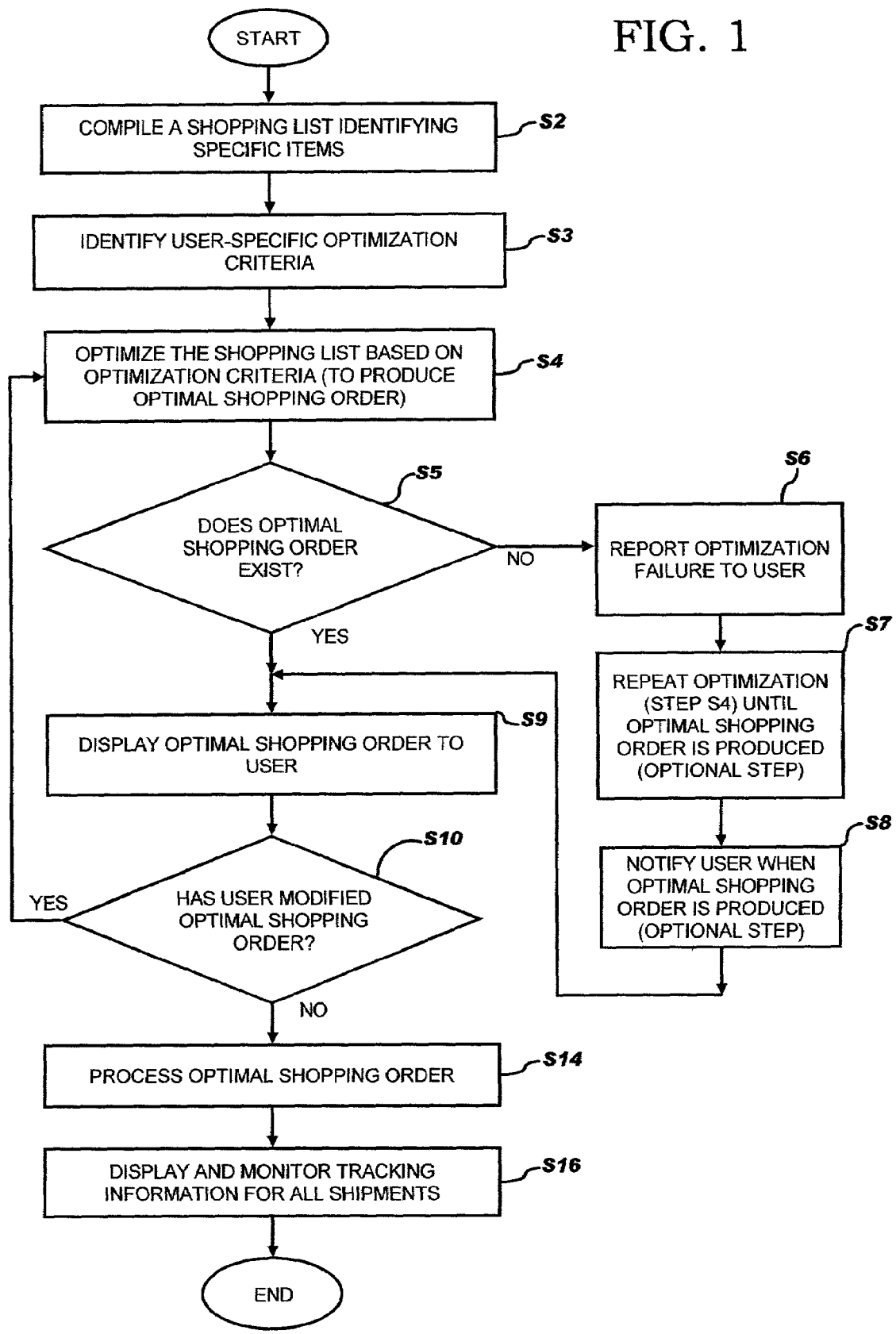
FIG. 1 is a flowchart illustrating the processing steps of a method for providing online comparison shopping according to one embodiment of the present invention.

In the drawings, the same reference numerals are used to indicate the same elements.

FIG. 1 is a flowchart illustrating the processing steps of a method of providing online comparison shopping according to one embodiment of the present invention. These processing steps can be implemented by a computer program executable by a computer system. Preferably, these processing steps are implemented by an online comparison shopping website system that provides and maintains an online comparison shopping website accessible by users through the Internet.

As shown in FIG. 1, a particular user's shopping list which identifies specific items that the user wishes to purchase, is compiled by the website system in Step S2. This can be accomplished by providing a menu of items selectable by the user. The shopping list identifies specific items to be purchased (e.g., one IBM 6400 Line Matrix Printer, one Sony KV-27FS12 27" FD Trinitron WEGA Stereo Color TV, etc.). That is, the items are identified by a product name, manufacturer, serial number, part number, etc. In certain situations, however, the user may not know the specific item that he or she desires to purchase, but may only know the general category of the item. For example, the user may desire to purchase a computer monitor without having any specific preference as to the manufacturer, model number, etc. In those cases, the system can be configured to provide an online product search engine that is well known in the art. The user can enter "computer monitor" into the search field which causes the system to provide a list of specific computer monitors offered by online vendors. The user can select one item from this list to add the selected item to the user's shopping list maintained by the website system.

In Step S3, the system is configured to identify the user's preferred optimization/shopping criteria to be used in determining an optimal shopping order for the shopping list. This can be accomplished by providing graphical user interfaces or menus that list a number of different categories of optimization criteria for the user's selection. The optimization criteria selectable by the user can be one or more of the following examples of criteria: "the lowest total cost" for determining an optimal shopping order that provides the lowest total cost including shipping and sales taxes, "vendor preference/non-preference" for including or excluding vendors preferred or disliked by the user when determining an optimal shopping order, "shipping methods" for including user-preferred shipping method(s) (e.g., UPS, FedEx, Airborne Express) when determining an optimal shopping order, "the fastest delivery time" for determining an optimal shopping order that provides the fastest delivery of all items identified in the order, "item availability" for determining an optimal shopping order based on the user-preferred item availability, such as available now, available in 24 hours, available in one week, etc., "total order cost" or "price range requirement" for determining an optimal shopping order that satisfies certain price requirement(s) such as "less than $x", etc. In addition, the optimization criteria may include placing different weights on different vendors. For instance, the user might not wish to place orders with a particular vendor unless its total price is X% or $Y less than that offered by other online vendors. Similarly, different weights can be given to different shippers or shipment methods (e.g., overnight delivery, 2nd day delivery, etc.). For certain selections of optimization criteria by the user, an additional input by the user may be needed. For instance, the selection of "vendor preference" will require an input of the user's preferred vendor name(s). In these cases, screen boxes, menus, or other graphical user interfaces are provided to solicit appropriate responses from the user using known techniques. If multiple optimization criteria are selected by the user, the user may be able to set a priority order in which these criteria are to be applied, or the system can set this priority order according to predetermine guidelines.

In addition to the optimization criteria selectable by the user, there may exist a set of "fixed" optimization criteria that are pre-set by the system and always used by the system during the order optimization process. The fixed optimization criteria may not be "turned off" by the user. Such fixed optimization criteria may include, but are not limited to, special offers by vendors, minimum vendor ordering requirements for considering any minimum order requirements set by specific vendors when determining an optimal shopping order, etc.

In Step S4, once the user selects or identifies the user's preferred optimization criteria, the shopping list is optimized based on the user's optimization criteria and any fixed optimization criteria to produce an optimal shopping order. This is accomplished using existing optimization techniques or computer programs. For example, assume that the user's shopping list identifies purchasing the following products: 1) one IBM 6400 Line Matrix Printer, and 2) one Sony KV-27FS12 27" FD Trinitron WEGA Stereo Color TV, and that the user has selected the optimization criteria to be "the lowest total cost" and "the fastest delivery time." Then the system optimizes this shopping list based on the selected optimization criteria (and any fixed optimization criteria) to determine a single vendor for each of these items who can provide the item with the fastest delivery time at the lowest price (including shipping charges and tax).

In some cases, the system is not able to generate an optimal shopping order because, e.g., the user has requested an item that is currently not offered by any online vendor or the user has specified a total price limit that currently cannot be met. If the optimization process (Step S4) does not produce an optimal shopping order, i.e., if the system determines at Step S5 that an optimal order does not exist, then this optimization failure is reported to the user in Step S6, e.g., by displaying a message on the user's screen At the same time, the user can be informed that the system will attempt to optimize the shopping list periodically and that the user will be notified when the optimization succeeds. Then, in Step S7, the system attempts to optimize the shopping list by repeating the optimization process of Step S4 periodically until a successful optimization occurs. The user may set how frequently the optimization attempts are to be made, e.g., one attempt per day for next 10 days. The user (or system) may set a limit on the number of times the optimization attempt is made per shopping list to avoid an endless repetition of the optimization attempt. Once a successful optimization occurs, the system in Step S8 can be configured to notify the user that an optimal shopping order has been produced based on the user's shopping list and optimization criteria. This notification message will also identify a unique shopping order identifier that is associated with the user's optimal shopping order. This notification message can be sent to the user via known communication means such as an e-mail, fax, pager, phone, etc. Once the user gets this message, the user can log back into the website system, cause the system to display the shopping order in Step S9 using the shopping order identifier, and resume the online comparison shopping process. It should be noted that Steps S7 and S8 are optional steps which can be triggered selectively by the user (or system), e.g., by setting the number of re-optimization attempts to zero. And, if Steps S7 and S8 are not triggered, then the process ends after Step S6.

At Step S5, however, if it is determined that an optimal shopping order exists, then this shopping order is displayed automatically to the user in Step S9, e.g., on the user's display device. The user views the optimal shopping order such as item name, price, delivery speed, delivery method, etc. If the user desires to modify the optimal shopping order, the system is configured to allow the user to modify certain parts of the optimal shopping order. For example, the user can remove certain items entirely from the optimal shopping order, or change the quantity of the item in the optimal shopping order. If the system determines that the user has modified the optimal shopping order at Step S10, then the process returns to Step S4 and the system is configured to re-optimize the current shopping order based on the user's modifications to produce an updated shopping order (if available). The user can modify the optimal shopping order at any time until the user accepts the optimal shopping order.

If the user has not modified the optimal shopping order and has indicated that the user accepts the current optimal shopping order at Step S10, then the optimal shopping order is processed in Step S14 to implement the ordering processes according to known techniques For example, the optimal shopping order can be placed with multiple vendors using techniques similar to those described in the above-described PCT Patent Publication No. WO 00/43858 or U.S. Pat. No. 5,966,698.

Once the optimal shopping order is placed with the vendors, each vendor sends their shipment tracking information to the present system in Step S16, e.g., via the Internet according to known web page/message communication techniques. The system is configured to display to the user (e.g., on the user's display device) the shipment tracking information for all shipments of the items identified in the optimal shopping order. This allows the user to track easily multiple shipments from the different vendors from a central location (e.g., through a single website) so that it is no longer necessary for the user to individually track multiple shipments through different vendors' websites. This simplifies the shipment tracking process for the user and enhances the user's online shopping experience significantly.

After Step S16, the online comparison shopping process according to the present invention is completed.

Depending on the complexity of the order optimization performed, the number of items in the shopping list, and the number of vendors known to the system, etc., the optimization process may take some time to complete in which case the optimization process is completed off-line. If the system determines that the optimization processing time will exceed a certain predetermined time limit, then the system informs the user that the system will notify the user when the off-line optimization process is completed. Once the off-line optimization process is completed, a notification message is sent to the user via existing communication means such as an e-mail, phone, pager, fax, etc. This notification message includes a unique identifier that the user can use to log back into the system and access the result of the completed optimization process. If the results of the optimization process indicate that the optimization has failed (i.e., no optimal shopping order exists), then the process returns to Step S6, and Step S6 and the subsequent steps are performed. If the results of the optimization process indicate that the optimization has succeeded (i.e., an optimal shopping order exists), then the process returns to Step S9, and Step S9 and the subsequent steps are performed as discussed above.

According to the present invention, all optimal shopping orders (both online and off-line) are verified using known validation techniques, just before the user can check out the order. This is to ensure that the shopping order that is checked out by the user is valid when the actual check-out occurs. Such a validation process is well known in the art. For example, on-line airline reservation systems such as http://www.travelocity.com verify that the flight and the pricing are still valid just before a check-out can be made because prices and even the availability of specific flights can change within minutes due to the complicated pricing structure of airline flights and the limited number of seats per flight.

In the present embodiment, when the user makes modifications to the optimal shopping order as in Step S10, the system automatically re-optimizes the shopping order by returning to Step S4. However, in another embodiment, the user is able to choose either the full re-optimization of the optimal shopping order or a simple cost recalculation of the order based on the user's modifications. This selection can be made in advance or when the user modifies the optimal shopping order. If the user selects the cost recalculation, then the system merely recalculates the total order cost based on the user's modification and does not necessarily perform the full optimization process.

Figure 2:
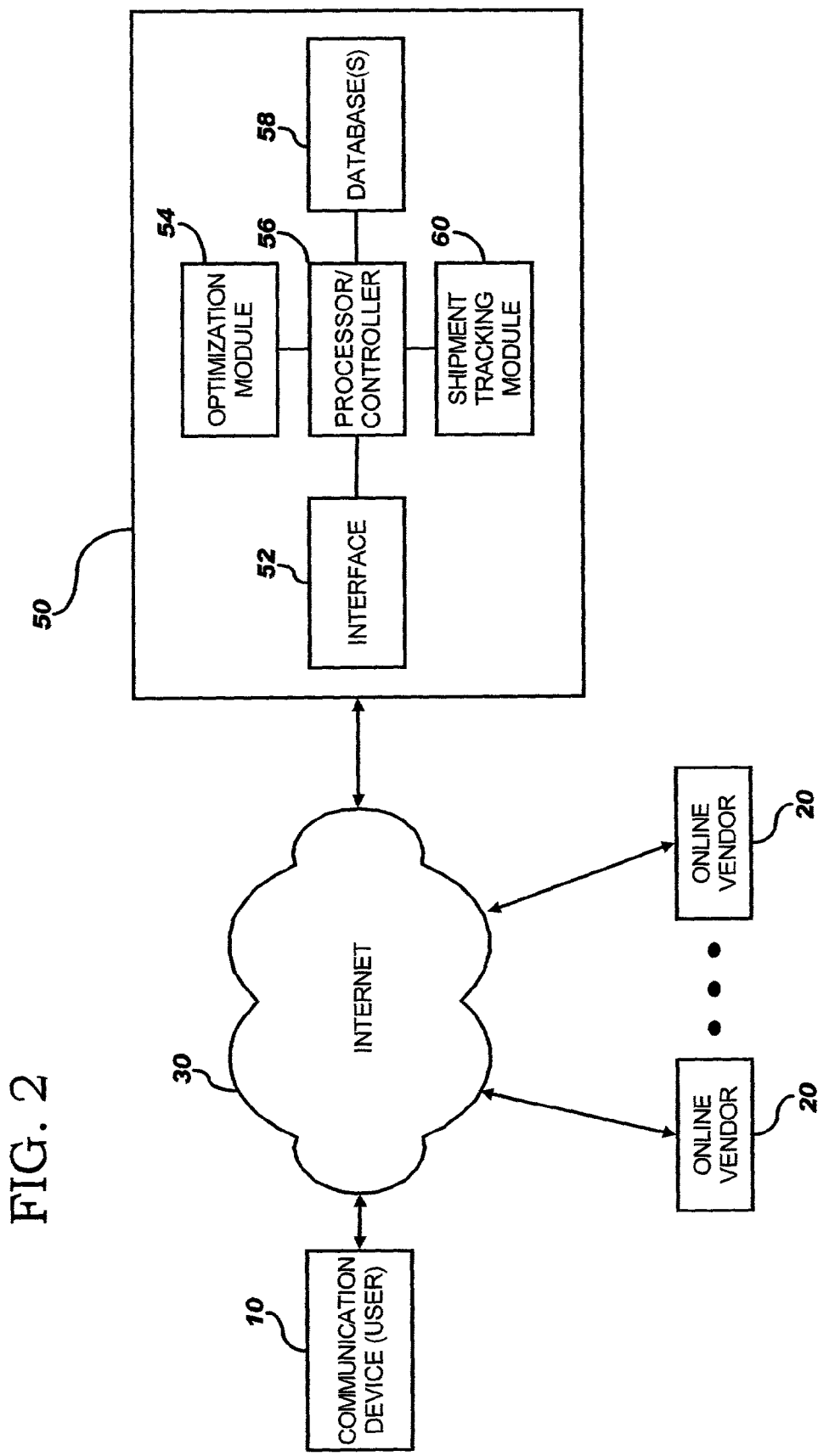
FIG. 2 is a block diagram of a system for providing online comparison shopping according to one embodiment of the present invention.

FIG. 2 is a system 50 for providing online comparison shopping according to one embodiment of the present invention. The processing steps discussed in connection with FIG. 1 can be implemented in the system 50 according to one embodiment of the present invention. As shown in FIG. 2, the system 50 communicates with at least one communication device 10 and a plurality of online vendors 20 through a communication network such as the Internet 30, an extranet. The communication device 10 is any existing device that allows a user to access the system 50, and can be, e.g., a PC (personal computer), a wireless PDA, a smart phone, a WebTV device, a two-way pager, a mobile phone, etc. The system 50 is a website system that maintains an online comparison shopping website which the user can access using the communication device 10 through the Internet 30. The system 50 includes an interface 52 for communicating with the communication device 10 and the online vendors 20, an optimization module 54, database(s) 58, a shipment tracking module 60, and a processor/controller 56 for controlling these components. In addition, the system 50 includes components typically found in conventional online comparison shopping website systems such as servers, etc. All these components are operatively coupled.

The interface 52 receives all user inputs from the communication device 10 through the Internet 30. The processor/controller 56 compiles the user's shopping list based on the user's inputs received from the interface 52. The processor/controller 56 also receives the user-specified optimization/shopping criteria and forwards them with the user's shopping list to the optimization module 54. The optimization module 54 optimizes the user's shopping list based on the user-specified optimization criteria and any fixed optimization criteria and produces an optimal shopping order for the user using existing optimization techniques or computer programs. The processor/controller 56 communicates the results of the optimization process and any other notification messages to the user according to known techniques. The database(s) 58 store therein information about online vendors, their product information including prices and product descriptions, their shipping methods, their special offers, and/or any other information that can be used or needed to implement the present invention. Some of this information may be automatically supplied and updated by the associated online vendors.

The shipment tracking module 60 tracks shipments for all items ordered according to the optimal shopping order. The shipment tracking module 60 is configured to receive automatically, through the interface 52, shipment tracking information (e.g., tracking number, etc.) for all items shipped by the different vendors. This allows the present system to maintain the shipment tracking information for all the items purchased under a single shopping order, even if the shipments are made by different vendors. The shipment tracking module 60 allows the user to access this shipment tracking information automatically or at any time the user desires through the online comparison shopping website, so that the user can monitor, from a central location, the shipment process for all the items purchased under one single shopping order.

Accordingly, the present invention improves the online comparison shopping experience of the user by automatically determining the optimal shopping order of items specified in the user's shopping list based on the user's own optimization/shopping criteria. Thus, the user does not need to select a vendor from a list of multiples vendors to manually select the best shopping order as in prior art systems since this process is performed by the website system on behalf of the user. Furthermore, the user can review and monitor different shipments for all the items specified in the shopping order from a central location, so that it is no longer necessary for the user to individually track shipments for each of the purchased items identified in the shopping order. This process is convenient to the user and saves a significant amount of time for the user.

The processing steps and the components of the present invention can be implemented by computer programs in conjunction with hardware components. Software programming code which embodies the present invention may be stored on any of a variety of known media such as a diskette, hard drive, CD-ROM, or read-only memory, and may be distributed on such media. The techniques and methods for embodying software programming code on physical media and/or distributing software code are known in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for providing online comparison shopping, from among two or more vendors, by a website system accessible by a user through a communication network, the method comprising the steps of:
    compiling a shopping list identifying specific items to be purchased;
    receiving optimization criteria specified by the user;
    optimizing, by the website system, the shopping list based on the optimization criteria to produce an optimal shopping order, said optimization criteria being applied to offerings of said specific items made by at least two of said two or more vendors;
    displaying the optimal shopping order to the user;
    receiving the user's modifications to the optimal shopping order;
    receiving a request from the user to perform only a recalculation of a total cost for the optimal shopping order;
    recalculating, in response to the user's request, the total cost for the optimal shopping order based on the user's modifications to produce an updated optimal shopping order; and
    displaying the updated optimal shopping order to the user.

2. The method of claim 1, further comprising:
    receiving the user's modifications to the optimal shopping order;
    re-optimizing the shopping list based on the modifications to produce an updated optimal shopping order; and
    displaying the updated optimal shopping order to the user.

3. The method of claim 1, further comprising:
    receiving an acceptance of the optimal shopping order from the user; and
    processing the optimal shopping order in response to the receipt of the acceptance from the user.

4. The method of claim 3, further comprising:
    receiving shipment tracking information from multiple vendors for all items identified in the optimal shopping order; and
    displaying the shipment tracking information to the user.

5. The method of claim 4, wherein the shipment tracking information identifies a plurality of different tracking numbers corresponding to the multiple vendors' shipments of all items identified in the optimal shopping order.

6. The method of claim 1, wherein, in the receiving step, the optimization criteria include at least one of the following: the lowest total cost including shipping and sales tax for all items identified in the optimal shopping list, vendor preference, vendor dislikes, a user-preferred shipping method, the fastest delivery time for the all items identified in the optimal shopping list, item availability, total order cost, and price range.

7. The method of claim 1, further comprising:
    providing by the websites system a website accessible by the user for receiving inputs from the user to perform at least one of the compiling step, identifying step, and displaying step.

8. The method of claim 1, further comprising:
    reporting an optimization failure to the user if the optimizing step does not produce an optimal shopping order.

9. The method of claim 8, further comprising:
    repeating said optimizing step until an optimal shopping order is produced; and
    notifying the user when the optimal shopping order is produced.

10. The method of claim 1, wherein the optimizing step is performed off-line, and the method further comprises:
    notifying the user with a notification message when the off-line optimizing step is completed.

11. The method of claim 10, wherein, in the notifying step, the notification message is communicated to the user using one of the following: an e-mail, a pager, a phone, a facsimile, and a PDA (personal digital assistant).

12. The method of claim 10, wherein the notification message includes a unique identifier to be used by the user to access the optimal shopping order through the website system.

13. A computer program embodied on computer readable media readable by a computer system, for providing online comparison shopping from among two or more vendors, the computer system being a website system accessible by a user through a communication network, the computer program product comprising computer executable instructions for:
    compiling a shopping list identifying specific items to be purchased;
    receiving optimization criteria specified by the user;
    optimizing, by the website system, the shopping list based on the optimization criteria to produce an optimal shopping order, said optimization criteria being applied to offerings of said specific items made by at least two of said two or more vendors;
    displaying the optimal shopping order to the user;
    receiving the user's modifications to the optimal shopping order;
    receiving a request from the user to perform only a recalculation of a total cost for the optimal shopping order;

recalculating, in response to the user's request, the total cost for the optimal shopping order based on the user's modifications to produce an updated optimal shopping order; and displaying the updated optimal shopping order to the user.

14. The computer program product of claim 13, further comprising computer executable instructions for:

receiving the user's modifications to the optimal shopping order;

re-optimizing the shopping list based on the modifications to produce an updated optimal shopping order; and displaying the updated optimal shopping order to the user.

15. The computer program product of claim 13, further comprising computer executable instructions for:

receiving an acceptance of the optimal shopping order from the user; and processing the optimal shopping order in response to the receipt of the acceptance from the user.

16. The computer program product of claim 15, further comprising computer executable instructions for:

receiving shipment tracking information from multiple vendors for all items identified in the optimal shopping order; and displaying the shipment tracking information to the user.

17. The computer program product of claim 16, wherein the shipment tracking information identifies a plurality of different tracking numbers corresponding to the multiple vendors' shipments of all items identified in the optimal shopping order.

18. The computer program product of claim 16, wherein the optimization criteria include at least one of the following: the lowest total cost including shipping and sales tax for all items identified in the optimal shopping list, vendor preference, vendor dislikes, a user-preferred shipping method, the fastest delivery time for the all items identified in the optimal shopping list, item availability, total order cost, and price range.

19. The computer program product of claim 16, further comprising computer executable instructions for:

providing by the websites system a website accessible by the user for receiving inputs from the user.

20. The computer program product of claim 13, further comprising computer executable instructions for:

reporting an optimization failure to the user if the optimizing does not produce an optimal shopping order.

21. The computer program product of claim 20, further comprising computer executable instructions for:

repeating said optimizing until an optimal shopping order is produced; and notifying the user when the optimal shopping order is produced.

22. The computer program product of claim 13, wherein the optimizing is performed off-line, and the computer program product further comprises computer executable instructions for:

notifying the user with a notification message when the off-line optimizing is completed.

23. The computer program product of claim 22, wherein the notification message is communicated to the user using one of the following:

an e-mail, a pager, a phone, a facsimile, and a PDA (personal digital assistant).

24. The computer program product of claim 22, wherein the notification message includes an identifier to be used by the user to access the optimal shopping order from the website system.

25. A website system for providing online comparison shopping from among two or more vendors, the system comprising:

an interface for receiving inputs from the user through a communication network;

a processor, operatively coupled to the interface, for compiling a shopping list identifying specific items to be purchased based on the inputs from the user and receiving optimization criteria specified by the user from the interface; and an optimization module, operatively coupled to the processor, for optimizing the shopping list based on the optimization criteria to produce an optimal shopping order, said optimization criteria being applied to offerings of said specific items made by at least two of said two or more vendors, wherein:

the optimal shopping order is displayed to the user;

the processor receives, from the interface, the user's modifications to the optimal shopping order and a request from the user to perform only a recalculation of a total cost for the optimal shopping order, and recalculates, in response to the user's request, the total cost for the optimal shopping order based on the user's modifications to produce an updated optimal shopping order; and the updated optimal shopping order is displayed to the user.

26. The system of claim 25, wherein the optimization module receives the user's modifications to the optimal shopping order from the interface, and re-optimizes the optimal shopping order based on the user's modifications to produce an updated optimal shopping order, and wherein the updated optimal shopping order is displayed to the user.

27. The system of claim 25, wherein the interface receives an acceptance of the optimal shopping order from the user, and the processor processes the optimal shopping order in response to the acceptance of the optimal shopping order.

28. The system of claim 27, further comprising:

a shipment tracking interface, operatively coupled to the processor, for receiving shipment tracking information from multiple vendors for all items identified in the optimal shopping order through the communication network, and communicating the shipment tracking information to the user through the interface.

29. The system of claim 28, wherein the shipment tracking information identifies a plurality of different tracking numbers corresponding to the multiple vendors' shipments of all items identified in the optimal shopping order.

30. The system of claim 25, wherein the optimization criteria include at least one of the following: the lowest total cost including shipping and sales tax for all items identified in the optimal shopping list, vendor preference, vendor dislikes, a user-preferred shipping method, the fastest delivery time for the all items identified in the optimal shopping list, item availability, total order cost, and price range.

31. The system of claim 25, wherein the processor provides a website accessible by the user for receiving inputs from the user.

32. The system of claim 25, further comprising:

a storage, accessible by the processor, for storing vendor information, vendor's shipping method information, and product information.

33. The system of claim 25, wherein the optimization module notifies the user when its shopping order optimization process fails.

34. The system of claim 33, wherein the optimization module repeats its shopping order optimization process until an optimal shopping order is produced, and the processor notifies the user when the optimization process produces the optimal shopping order.

* * * * *